(12) United States Patent
Faure

(10) Patent No.: US 9,682,888 B2
(45) Date of Patent: Jun. 20, 2017

(54) COATED GRANULES FOR CONSTRUCTION APPLICATIONS

(75) Inventor: Regine Faure, Paris (FR)

(73) Assignee: CERTAINTEED CORPORATION, Malvern, PA (US)

( * ) Notice: Subject to any disclaimer, the term of this patent is extended or adjusted under 35 U.S.C. 154(b) by 0 days.

(21) Appl. No.: 13/269,692

(22) Filed: Oct. 10, 2011

(65) Prior Publication Data

US 2013/0089707 A1    Apr. 11, 2013

(51) Int. Cl.
| | |
|---|---|
| *C04B 20/12* | (2006.01) |
| *B82Y 30/00* | (2011.01) |
| *C09C 1/36* | (2006.01) |
| *C09C 1/40* | (2006.01) |
| *C09C 3/00* | (2006.01) |
| *C09C 3/06* | (2006.01) |
| *C09C 3/10* | (2006.01) |
| *C09C 1/10* | (2006.01) |
| *C09C 1/24* | (2006.01) |
| *C09C 1/34* | (2006.01) |
| *B01J 2/00* | (2006.01) |

(Continued)

(52) U.S. Cl.
CPC ............... *C04B 20/12* (2013.01); *B01J 2/006* (2013.01); *B01J 2/16* (2013.01); *B82Y 30/00* (2013.01); *C09C 1/10* (2013.01); *C09C 1/24* (2013.01); *C09C 1/34* (2013.01); *C09C 1/3661* (2013.01); *C09C 1/3676* (2013.01); *C09C 1/3692* (2013.01); *C09C 1/40* (2013.01); *C09C 1/405* (2013.01); *C09C 3/006* (2013.01); *C09C 3/063* (2013.01); *C09C 3/10* (2013.01); *E04D 7/005* (2013.01); *C01P 2004/03* (2013.01); *C01P 2004/32* (2013.01); *C01P 2004/80* (2013.01); *C01P 2006/40* (2013.01); *C04B 2111/00586* (2013.01); *Y10T 428/2438* (2015.01)

(58) Field of Classification Search
CPC ...... B82Y 30/00; C09C 1/3661; C09C 1/3676; C09C 1/3692; C09C 1/40; C09C 1/405; C09C 3/006; C09C 3/063; C09C 3/10; C09C 1/10; C09C 1/24; C09C 1/34; C04B 20/12; C04B 14/00; C04B 20/1092; C04B 20/1066; C04B 20/126; C04B 2111/00586; E04D 7/005; Y10T 428/2438; C01P 2004/32; C01P 2006/40; C01P 2004/80; C01P 2004/03
USPC .......................................................... 428/144
See application file for complete search history.

(56) References Cited

U.S. PATENT DOCUMENTS

| | | |
|---|---|---|
| 2,981,636 A | 4/1961 | Lodge et al. |
| 4,378,408 A | 3/1983 | Joedicke |

(Continued)

FOREIGN PATENT DOCUMENTS

GB        2477932      *   8/2011   ............ B32B 27/20

OTHER PUBLICATIONS

U.S. Appl. No. 13/101,838, filed May 5, 2011, Aguiar.

(Continued)

*Primary Examiner* — Nathan Van Sell
(74) *Attorney, Agent, or Firm* — Abel Law Group, LLP; Alexander H. Plache

(57) ABSTRACT

Provided are construction material granules. In one embodiment, the granules include a core enclosed by a layer comprising a conductive material and a layer comprising a dielectric material. Also provided are related methods of constructing such materials.

24 Claims, 6 Drawing Sheets

(51) Int. Cl.
*B01J 2/16* (2006.01)
*E04D 7/00* (2006.01)
*C04B 111/00* (2006.01)

(56) References Cited

U.S. PATENT DOCUMENTS

| | | | |
|---|---|---|---|
| 5,411,803 | A | 5/1995 | George et al. |
| 5,723,516 | A | 3/1998 | Bigham et al. |
| 7,592,066 | B2 | 9/2009 | Shiao et al. |
| 8,277,943 | B2 | 10/2012 | Viasnoff et al. |
| 2005/0069707 | A1 | 3/2005 | Tysoe et al. |
| 2006/0251807 | A1 | 11/2006 | Hong et al. |
| 2008/0241472 | A1* | 10/2008 | Shiao et al. ............... 428/144 |
| 2010/0047566 | A1 | 2/2010 | Viasnoff et al. |
| 2010/0151199 | A1* | 6/2010 | Shiao et al. ............... 428/144 |
| 2012/0282471 | A1 | 11/2012 | Aguiar |
| 2013/0089741 | A1 | 4/2013 | Viasnoff et al. |

OTHER PUBLICATIONS

U.S. Appl. No. 13/269,767, filed Oct. 10, 2011, Viasnoff.
Berhard Wolf, "Handbook of ION Sources," published Aug. 31, 1995, CRC Press, ISBN 9780849325021, p. 222.

* cited by examiner

COATED GRANULES FOR CONSTRUCTION APPLICATIONS

TECHNICAL FIELD

The present disclosure relates to the field of granules used in construction materials and to the field of reflective thin films.

BACKGROUND

Sloped roofs are typically covered with mineral-surfaced asphalt shingles, such as those described in ASTM D225 ("Standard Specification for Asphalt Shingles (Organic Felt) Surfaced with Mineral Granules") or D3462 ("Standard Specification for Asphalt Shingles Made From Glass Felt and Surfaced with Mineral Granules"), to provide a water-shedding function while adding an aesthetically pleasing appearance to the roofs.

Such asphalt shingles are normally made from asphalt-impregnated fabrics. The shingles also typically include colored roofing granules to provide aesthetically pleasing coloration to the shingles as well as to impart strength and durability to the shingles. The roofing granules are typically also used in asphalt-based roofing articles to protect the asphalt from the effects of incident ultraviolet radiation.

It is known in the art, however, that conventional roofing materials, such as asphaltic shingles, reflect comparatively little near-infrared ("NIR" radiation; λ=about 700 nm to about 2500 nm) radiation and, as a consequence, absorb substantial solar heat. This absorption increases with dark-colored shingles; while white or lighter colored asphalt shingles may have a solar reflectance in the range of about 25% to about 35%, dark-colored asphalt shingles may have a solar reflectance of only about 5 to about 15%. This absorption of solar heat typically results in elevated temperatures in the environment surrounding the shingle.

This elevation in temperature in turn gives rise to so-called heat-island effects that increase the need for energy-consuming cooling systems to offset these heat-island effects. Heat-island effects caused by the solar heat absorption of a dark-colored roofing article can be significant—temperatures as high as 77° C. (171° F.) have been observed on the surface of black roofing shingles on a sunny day having an ambient temperature of only about 21° C. (70° F.).

Several efforts have been made to address the challenges created by the described heat-island effects. Some have proposed incorporation of application of white- or light-colored pigments or coatings directly to roofing articles to enhance the articles' reflectivity. Consumers of roofing materials, however, show a preference for black or dark-colored roofing articles.

Others have proposed roofing articles or granules having metal flakes, such as aluminum flakes, adhered to their surfaces, to provide a radiation-reflective surface. Such approaches, however, impart reflectivity to the roofing article and are not always aesthetically pleasing to consumers. Accordingly, there is a need for improved materials that possess desirable NIR reflectance characteristics while also providing an aesthetically pleasing appearance that allows for, e.g., construction of dark-colored roofing articles and other construction materials.

SUMMARY

In meeting the described challenges, the present disclosure first provides coated construction granules, the granules comprising a core enclosed by a layer comprising a conductive material and by a layer comprising a dielectric material, the coated construction granule reflecting greater than about 20% of incident solar radiation.

Also provided are methods of fabricating a coated construction granule, comprising disposing, about a core, (1) a conductive layer having a thickness in the range of from about 10 nm to about 5 micrometers, and (2) at least one dielectric layer having a thickness in the range of from about 10 nm to about 1 mm.

Further provided are bituminous construction materials, comprising a substrate sheet of a fibrous material saturated with a bituminous coating material and a plurality of coated granules, a coated granule comprising a core having a cross-sectional dimension of between about 200 nm and about 3 mm, a coated granule further comprising a conductive layer disposed about the core, and a dielectric layer disposed about the core, the bituminous construction material capable of reflecting at least about 20% of incident solar radiation, and the bituminous construction material having an emissivity of at least about 50%. These construction materials are particularly suitable for roofing applications.

BRIEF DESCRIPTION OF THE DRAWINGS

The summary, as well as the following detailed description, is further understood when read in conjunction with the appended drawings. For the purpose of illustrating the disclosure, there are shown in the drawings exemplary embodiments of the disclosure; however, the disclosure is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
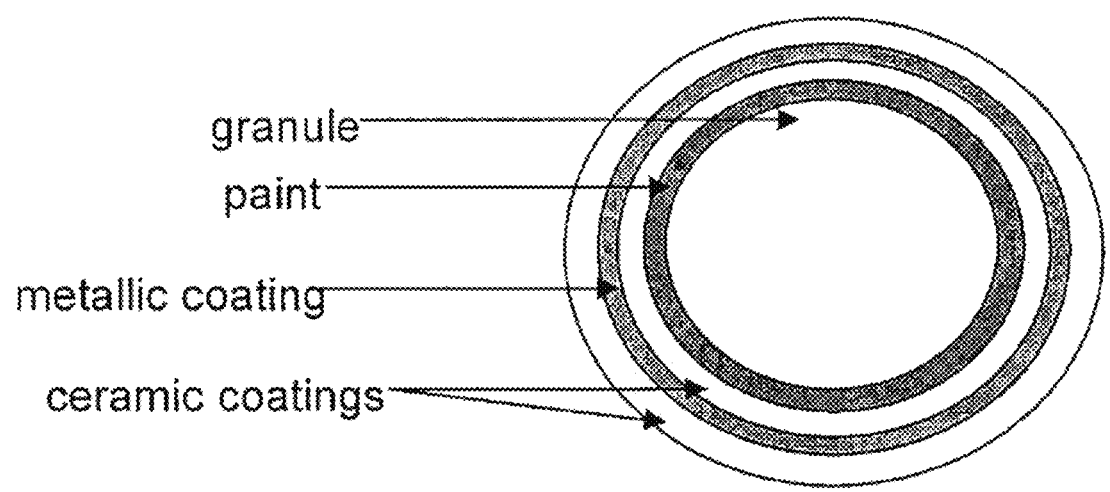
FIG. 1 depicts a non-limiting embodiment of the disclosure materials, in which a core is enclosed by paint or a pigment and dielectric and conductive coatings.

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the disclosure. Also, as used in the specification including the appended claims, the singular forms "a," "an," and "the" include the plural, and reference to a particular numerical value includes at least that particular value, unless the context clearly dictates otherwise.

The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the disclosure which are, for clarity, described herein in the context of separate embodiments, may also be provided in combination in a single embodiment. Conversely, various features of the disclosure that are, for brevity, described in the context of a single embodiment, may also be provided separately or in any subcombination. Further, references to values stated in ranges include each and every value within that range. All cited publications are incorporated herein by reference in their entireties.

In a first aspect, the disclosure provides coated construction granules. These granules suitably include a core enclosed by two or more layers. One layer is suitably a conductive material, and another layer is suitably a dielectric. The conductive and dielectric layers suitably contact one another.

The coated construction granule suitably reflects more than about 20%, 30%, 40% or even 50% of incident solar radiation. In some embodiments, the granule reflects 60%, 70%, or even up to 80% of incident solar radiation; reflectance of 90% or even 95% is within the scope of the present disclosure.

The coated granule may also have an emissivity of at least about 50%, of at least about 75%, or even at least about 80% or even at least about 90%. Granules having a comparatively high reflectance of solar radiation along with comparatively high emissivity are especially suitable, as such granules are capable of both reflecting incident radiation and emitting energy, so as to avoid the "heat island" effect described above. Granules having an emissivity of 40%, 50%, 60%, 70% or even 80% are all considered suitable.

A variety of materials may be used in the conductive layers of the described granules. Suitable materials include metals, conductive oxides, and the like. Suitable metals include Ag, Cu, Au, Ni, Al, Ir, Pt, Rh, Cr, and the like. Combinations or mixtures of metals (e.g., alloys) are also suitable. As one example, a conductive layer may include Ag and Cu, or Cu and Ni. Silver and copper are considered especially suitable conductive materials for use in granules where antibacterial properties are desirable.

Metals may be applied by chemical processes, such as those used to deposit metals on mirrors. Chemical or physical vapor deposition may be used to apply metallic layers. Dip and spray coating processes may also be used to apply a metallic layer to the disclosed materials. Such processes (e.g., mirror manufacturing) are well-known to those of ordinary skill in the art. As one example, the National Glass Association website (http://www.glasswebsite.com/video/mirror.asp), provides information concerning application of metallic coatings. An exemplary reference for sputtering techniques is Bernhard Wolf (1995), Handbook of Ion Sources, CRC Press, p. 222, ISBN 0849325021.

Suitable conductive oxides used in the disclosed granules include indium-doped tin oxide, antimony-doped tin oxide, fluorine-doped tin oxide, niobium doped titanium oxide, boron-doped zinc oxide, aluminum-doped zinc oxide, antimony-doped zinc oxide, gallium-doped zinc oxide, and the like. Fluorine-doped tin oxide is considered especially suitable. Mixtures of oxides, mixtures of metals, and mixtures of oxides and metals are suitable for use in these conductive layers. A dopant may be present at from about 0.0001 wt % to about 50 wt % of the finished article; dopant presence in the range of from 0.01 wt % to 10 wt % is considered suitable.

The conductive layers of the described granules are suitably in the range of from about 10 nm to about 5 micrometers, or in the range of from about 20 nm to about 2 μm, or even in the range of from about 50 nm to about 1000 nm, or other intermediate ranges. Although the non-limiting embodiment in FIG. 1 shows the metallic layer separated from the core, a metallic layer may be in contact with the core.

The exemplary embodiment shown in FIG. 1 should not be understood as limiting the scope of the present disclosure. For example, a granule according to the present disclosure may include a core, a metallic coating, and a single ceramic coating. Multiple coatings, whether they be multiple metallic coatings, multiple ceramic (or other dielectric) coatings may be used, but they are not a requirement. Likewise, the presence of a paint or pigment on the granule is optional. The granule core may itself be colored, e.g., by inclusion of a pigment or paint in the material of the core or on the surface of the core.

In some embodiments, the disclosed granules may include a single metallic and a single dielectric layer. In other embodiments, the granules may include two metallic layers and a single dielectric layer. In still other embodiments, the granules include a single metallic layer and two dielectric layers, as shown in exemplary FIG. 1.

The dielectric material layer suitably has a thickness in the range of from about 10 nm to about 1 mm, or in the range of from 1 μm to about 500 micrometers, or in the range of from 10 micrometers to about 100 micrometers. A dielectric layer may have a thickness in the range of from about 1 micrometer to about 10 micrometers, or even of about 2-5 micrometers, or even about 3 micrometers.

The dielectric layer may include, for example, an oxide, nitride, oxinitride, carbide, oxicarbide or boride of one or more of the following elements: Hf, V, Nb, Cr, Mo, W, Mn, Fe, Zn, Sn, Ta, As, Sb, In, Si, Ti, Ze, Al. Mixtures of such materials are suitable for use as the dielectric material of the disclosed granules.

Ceramic materials may be suitably employed in the disclosed materials. Suitable ceramics include $SiO_2$, $TiO_2$, $ZrO_2$, and the like. Nonconducting ceramics are considered particularly suitable as dielectric materials.

Polymers may be included in the dielectric layer or even used as the dielectric layer itself. Suitable polymers include, inter alia, polyepoxide, polyacrylamide, acrylic polymers including polymers or copolymers of acrylic acid, butyl acrylate, 2-ethylhexyl acrylate, methyl acrylate, ethyl acrylate, acrylonitrile, methyl methacrylate, or trimethylolpropane triacrylate monomers, polyvinylacetate, polyvinylchloride, polyvinylidene fluoride, polychlorotrifluoroethylene, polyvinylfluoride, fluorinated ethylene-propylene, perfluoroalkoxy polymer resin, polytetrafluoroethylene, and the like. Mixtures and combinations of these polymers are also suitable, as are copolymers. The dielectric polymer is suitably chosen such that it is transparent or nearly transparent to electromagnetic radiation having a wavelength of from about 500 nm to about 2500 nm.

The conductive layer may suitably be disposed so as to contact a single dielectric layer, or, in other embodiments, disposed between first as second dielectric layers, as shown in non-limiting FIG. 1. Different dielectric layers may be of the same dielectric material or may be of different dielectric materials. Different dielectric layers may be of the same or of different thicknesses.

A dielectric layer may comprise a variety of materials, as described elsewhere herein. As one non-limiting example, a core may be enclosed by a layer of fluorine-doped tin oxide as a conductive material, with $TiO_2$ or $SiO_2$ present as an additional non-conductive layer. In this example, the transparent conductive oxide provides a high reflectivity, and the non-conductive oxide confers a high emissivity. In one particular embodiment the dielectric layer is applied directly onto the granule surface. In an alternative embodiment, a prime coat is employed, treating the surface of the granule prior to application of the dielectric layer. Suitable coating methods for application of the dielectric layer include pan coating, wet dipping, spraying, fluidized bed coating, powder coating, and thin film deposition (physical or chemical).

The core of the disclosed granules suitably has a diameter in the range of from about 50 nm to about 3 mm, or even in the range of from about 100 nm to about 1 mm, or even in the range of from about 200 nm to about 500 µm. The granules used in a particular construction material may be monodisperse or polydisperse in size, in composition, or both. Granules larger than 3 mm may be used; typical embodiments employ granules having a cross-sectional dimension in the range of from about 0.1 mm to about 2 mm.

Granule core materials suitably include titanium dioxide, carbon, chromium iron oxide, chrome, chromium oxide, chrome titanate, iron oxide, iron, cobalt aluminate, cobalt chromite, cobalt titanate, cadmium, nickel titanate, strontium chromate, mica, and the like. In particular, suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as manufactured or recycled manufactured materials such as crushed bricks or tile, concrete, porcelain, fire clay, proppant bodies, and the like. The core is suitably chemically inert. In one embodiment, the core is substantially opaque to ultraviolet light. Examples of such core materials include the rhyolite-based mineral particles from CertainTeed Corp, Norwood, Mass., ceramic-based particles from Saint-Gobain NorPro, Stow, Ohio, and the shale-based mineral particles from CertainTeed, Glenwood, Ariz.

In some embodiments, the granule is enclosed with a protective coating, such as an organic coating or an inorganic coating. Organic coatings include, for example, PMMA, fluoropolymer, polymer blends (e.g., acrylic/PVDF blend), emulsions, polymer coatings, alkyd coatings, and oils. Inorganic coatings include silica, silica emulsions, silicates, metal-silicates, phosphate or phosphate compound, alumina, siliconates, or a silicone. Transparent or nearly transparent coating materials are considered especially suitable. The coating may act to protect the granule from exterior environmental conditions. Suitable coating methods for application of the protective coating include pan coating, wet dipping, spraying, fluidized bed coating, powder coating, and thin film deposition (physical or chemical).

To achieve granules with a particular color appearance, the core may—as depicted by FIG. 1—be enclosed by a pigment or paint. As discussed above, dark-colored construction materials are considered aesthetically pleasing, but light-colored materials may also be fabricated using the claimed granules. In some embodiments, the granule core may itself be colored. Typically, roofing granules are produced by using inert mineral particles that are colored by pigments, clay, and alkali metal silicate binders in the processes as described by U.S. Pat. Nos. 2,981,636, 4,378,408, 5,411,803, and 5,723,516. Pre-colored roofing granules include 3M™ Classic Roofing Granules, available from 3M Company, Saint Paul, Minn., and Mineral Granules available from ISP Minerals Inc., Hagerstown, Md. Granules may be of virtually any size that is amenable for use with construction materials; standard granules have a cross-sectional dimension in the range of about 1 mm or so. Granule materials are well-known in the art; they may be coated with silver and/or copper and have a silica layer atop these layers.

The disclosure also provides methods of fabricating coated construction granules. These methods suitably include disposing, about a core, a conductive layer having a thickness in the range of from about 10 nm to about 5 µm, and at least one dielectric layer having a thickness of from about 100 nm to about 1 mm.

A conductive layer suitably has a thickness in the range of from about 10 nm to about 5 µm, or even from about 20 nm to about 2 µm, or even about 100 nm to about 500 nm. The dielectric layer suitably has a thickness in the range of from about 10 nm to about 1 mm, or from about 100 nm to about 750 micrometers, or from about 1 µm to about 500 µm, or in the range of from about 10 µm to about 100 µm.

Core materials are described elsewhere herein, and suitably include slate, slag, granite, rock, and other materials. The core material is suitably inert.

The disposition of the conductive layer is suitably accomplished by chemical vapor deposition, sol-gel processing, spray coating, sputtering, chemical solution deposition, and the like. Dielectric layers are suitably disposed by similar methods. U.S. Pat. No. 7,592,066 discloses roofing articles with reflective thin films and related methods for film deposition. United States Patent Application 2006/0251807 discloses production of roofing granules by suspending selected mineral particles in a selected medium to separate the individual particles, uniformly depositing a coating material, and curing the coating material.

In some embodiments, the conductive layer, the dielectric layer, or both, is disposed so as to contact the core directly. The user may also dispose a polymeric layer in contact with a dielectric or other layer, in order to supply additional protection or toughness to the coated granule.

As one nonlimiting example, a silver metal coating is applied to a granule core by in situ reduction of silver ion in a bath-type process. A silica layer is then applied via a fluidized process. The layered granule may then be surmounted with a silicone or polymer protective layer.

The methods also include disposing, about the core, a second dielectric layer having a thickness in the range of from about 10 nm to about 250 nm, or in the range of from about 50 nm to about 200 nm. A polymeric (or silicone) layer—suitably weather-resistant—may be applied about the granule, so as to provide additional protection or toughness.

Additionally provided are bituminous construction materials. These materials include a substrate of fibrous material saturated with a bituminous coating material and a plurality of coated granules. The coated granules suitably include a core having a cross-sectional dimension of between about 200 nm and about 3 mm, a conductive layer disposed about the core, and a dielectric layer disposed about the core, the bituminous construction material being capable of reflecting greater than about 20%, greater than about 30%, greater than about 40% or greater than 50% of incident solar radiation, and the bituminous construction material having an emissivity of at least about 50%, at least about 60%, at least about 75%, or even at least about 90%.

Granules suitable for the claimed materials are described elsewhere herein. Bituminous construction materials are known in the art, and include shingles, mats, and the like. The fibrous material suitably includes fiberglass fibers, although organic fibers may also be used. The population of granules used in such materials may be monodisperse in size and composition or polydisperse. For example, a material according to the present disclosure may be surmounted by a population of granules that includes granules having a silver metallic coating and also granules that have a copper metallic coating.

Fibrous, bituminous materials useful as a substrate for granule application are well-known in the art, and are commercially available. Granules suitable for inclusion in the described materials are also described elsewhere herein.

The improved roofing granules prepared according to the process of the present invention can be employed in the manufacture of roofing products, such as roofing shingles, using conventional roofing production processes. Typically, bituminous roofing products are sheet goods that include a non-woven base or scrim formed of a fibrous material, such as a glass fiber scrim. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. The improved roofing granules of the present invention can be mixed with conventional roofing granules, and the granule mixture can be embedded in the surface of such bituminous roofing products using conventional methods. Alternatively, the improved roofing granules of the present invention can be substituted for conventional roofing granules in manufacture of bituminous roofing products to provide those roofing products with improved properties.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand. Alternatively, the reverse side of the substrate sheet can be coated with an adhesive material, such as a layer of a suitable bituminous material, to render the sheet self-adhering. In this case the adhesive layer is preferably covered with a suitable release sheet.

Roofing granules are then distributed over selected portions of the top of the sheet, and the bituminous material serves as an adhesive to bind the roofing granules to the sheet when the bituminous material has cooled.

Optionally, the sheet can then be cut into conventional shingle sizes and shapes (such as one foot by three feet rectangles), slots can be cut in the shingles to provide a plurality of "tabs" for ease of installation, additional bituminous adhesive can be applied in strategic locations and covered with release paper to provide for securing successive courses of shingles during roof installation, and the finished shingles can be packaged. More complex methods of shingle construction can also be employed, such as building up multiple layers of sheet in selected portions of the shingle to provide an enhanced visual appearance, or to simulate other types of roofing products.

In addition, the roofing membrane can be formed into roll goods for commercial or industrial roofing applications.

Examples of suitable bituminous membranes for use in the process of the present invention include asphalt roofing membranes such as asphalt-based, self-adhering roofing cap sheet available from CertainTeed Corporation, Valley Forge, Pa., for example, Flintlastic® SA Cap, a granule covered roll roofing product which includes a polyester/fiberglass scrim combination mat impregnated with a rubber modified asphalt.

Preferably, the reinforcement material comprises a non-woven web of fibers. Preferably, the nonwoven web comprises fibers selected from the group of glass fibers, polymeric fibers and combinations thereof. Examples of suitable reinforcement material for use as a tie-layer include, but not limited to, non-woven glass fiber mats, non-woven polyester mats, composite non-woven mats of various fibers, composite woven fabrics of various fibers, industrial fabrics such as papermaker's forming fabrics and papermaker's canvasses, polymer netting, screen, and mineral particles. The fibers employed in preparing the reinforcing material can be spun, blown or formed by other processes known in the art. Yarn for forming the reinforcement material can include monofilament yarn, multi-filament yarn, spun yarn, processed yarn, textured yarn, bulked yarn, stretched yarn, crimped yarn, chenille yarn, and combinations thereof. The cross-section of the yarn employed can be circular, oval, rectangular, square, or star-shaped. The yarn can be solid, or hollow. The yarn can be formed from natural fibers such as wool and cotton; synthetic materials such as polyester, nylon, polypropylene, polyvinylidene fluoride, ethylene tetrafluroethylene copolymer, polyethylene terephthalate, polybutylene terephthalate, polytrimethylene terephthalate, poly(meth)acrylates, aramide, polyetherketone, polyethylene naphthalate, and the like, as well as non-organic materials such as spun glass fibers and metallic materials, or combinations thereof.

Non-woven glass fiber mats for use in the process of the present invention preferably have a weight per unit area of from about 40 to 150 g/m2, more preferably form about 70 to 120 g/m2, and still more preferably from about 80 to 100 g/m2, and a thickness of from about 0.01 to 1 mm. Non-woven glass mats having a weight per unit area of about 90 g/m2 (0.018 lb/ft2) are typically employed.

The bituminous material used in manufacturing roofing products according to the present invention is derived from a petroleum-processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, oils, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES AND NON-LIMITING EMBODIMENTS

Example 1

In one non-limiting embodiment, a granule according to the present disclosure is constructed as follows:

Core/Pigment/TiO$_2$ (116 nm)/Ag (25 nm)/TiO$_2$ (120 nm)

A computational assessment of this granule provided a theoretical solar reflectivity of about 67% whereas the uncoated core was considered to have a solar reflectivity of only 37%.

Example 2

A second granule according to the present disclosure is constructed as follows:

Core/Pigment/TiO$_2$ (112 nm)/Cu (25 nm)/TiO$_2$ (97 nm)

A computational assessment of this granule provides a theoretical solar reflectance of about 58% whereas the uncoated core was considered to have a solar reflectivity of only 37%.

Example 3

A first coating of Ag is deposited onto 20 g of granules by a 3 step process during which the granules are dipped successively in:

a first bath in 50 mL of a solution of SnCl$_2$ obtained by diluting 42 µL of Miraflex 1200 (product supplied by Dr Schmitt GmbH, Dieselstrasse 16, 64807 Dieburg, Germany) in 250 mL of deionized water;

a second bath in 50 mL of a solution of PdCl$_2$ obtained by diluting 135 µL of Miraflex PD (product supplied by Dr Schmitt GmbH) in 250 mL of deionized water; these two first baths are used to prepare the surface for silver deposition;

a third bath by mixing 50 mL of two solutions obtained by diluting 5 ml of respectively Miraflex S Silver Concentrate and Miraflex R Reducer Concentrate each in 250 mL of deionized water (both products supplied by Dr Schmitt GmbH). The reduction occurs when the solutions are mixed, and metallic silver is deposited onto the granules. The silvered granules have a pale grey and shiny aspect. The measured solar reflectivity reaches 55%.

A Cu coating is deposited onto 20 g of granules by a 3 step process during which the granules are dipped successively in:

a first bath in 50 mL of a solution of SnCl$_2$ obtained by diluting 42 µL of Miraflex 1200 (product supplied by Dr Schmitt GmbH, Dieselstrasse 16, 64807 Dieburg, Germany) in 250 mL of deionized water;

a second bath in 50 mL of a solution of PdCl$_2$ obtained by diluting 135 µL of Miraflex PD (product supplied by Dr Schmitt GmbH) in 250 mL of deionized water; these two first baths are used to prepare the surface for copper deposition; and a third bath by mixing 50 mL of two solutions: the first one is a basic CuSO$_4$ aqueous solution containing EDTA for stabilization; the second one is a basic formaldehyde solution (all products from VWR Prolabo, www.fr.vwr.com). The reduction occurs when the two solutions are mixed. The coppered granules have a red and shiny aspect. The measured solar reflectivity reaches 42% when deposition is done for 5 minutes on white painted granules with the following concentrations [Cu$^{2+}$]=0.04 mol/L, [EDTA]=0.04 mol/L and [formaldehyde]=0.8 mol/L.

Sodium silicate paint supplied by Oxychem (Dallas, USA) was added atop the metallic layer by a fluidized bed coating process. Exemplary processes are set forth in the cited references, including US Patent Application 2006/0251807. The granules are coated with approximately 0.3 g of paint per gram of granules. This layer confers emissivity, and the reflectivity drops to 10% for wavelength above 3 µm (i.e., an emissivity superior to 80% in that range). The resulting solar reflectivity (wavelength below 3 µm) was 40% for the silvered granules and 30% for the coppered ones.

In one exemplary silica deposition process, roofing granules are made using a chemical vapor deposition ("CVD") fluidized bed process. SiO$_2$ can be deposited: the precursor used for SiO$_2$ could be tetra-ethyl-ortho-silicate (TEOS). An exemplary process is further described in "Roofing Granules Including Base Particles and a Coating," U.S. patent application Ser. No. 13/101,838, which application is incorporated herein by reference in its entirety.

Example 4

Figure 2:
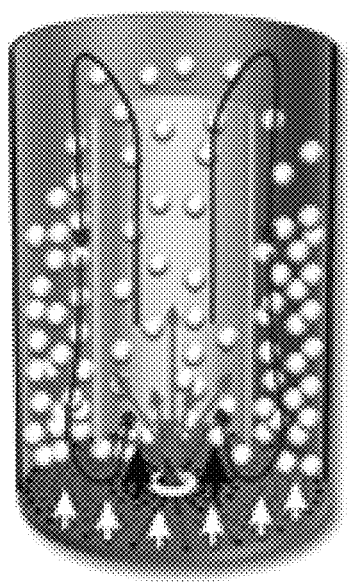
FIG. 2 depicts a Wurster bed process suitable for fabricating coated granules according to the present disclosure.
Figure 2:
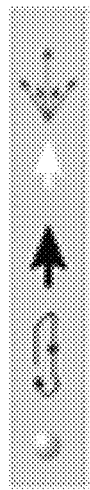

As one method of coating granules according to the present disclosure, a Wurster bed (illustrated in FIG. 2) was adapted for processing 500 g to 1 kg of roofing granules made by CertainTeed™. In a Wurster bed, particles circulate in the equipment and are sprayed with a liquid which forms a coating when dry, as shown in FIG. 2 The procedure is suitably performed for such duration that the desired characteristics of the coating layer are obtained. The process suitably involves a liquid spray that is generated through a nozzle.

As shown in FIG. 2, high and low velocity fluidizing gases flow upwards in the process vessel so as to motivate the particles to be coated. A coating solution spray is sprayed downwards so as to contact the fluidized particles. As shown in the figure, the particles may follow a path within the process vessel where they circulate through a inner cylinder or other portion of the process vessel, and cycle within the process vessel. Coated product particles are then recovered from the vessel following processing.

Figure 3:
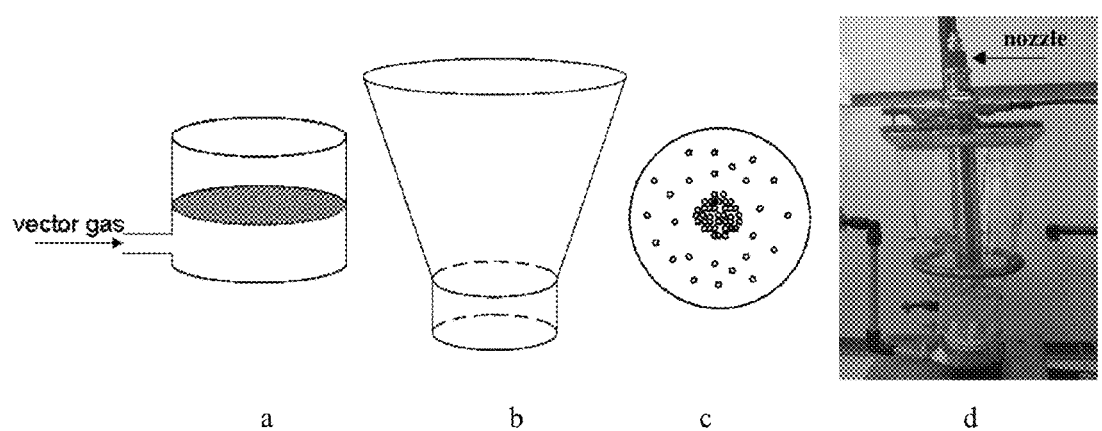
FIG. 3 depicts an exemplary fluidized bed configuration for fabricating coated roofing granules.

One exemplary configuration for production of coated granules is shown in FIG. 3. As shown in that figure, a vessel (e.g., a glass vessel) may be in two parts: the lower part contains a fritted disc through which a vector gas flows (FIG. 3a), the higher part is splayed or angled outward such that the vector gas slows and allows the granules to fall down (FIG. 3b). As shown in FIG. 3c, a higher concentration of holes may be present in the center of a fritted disc (present in the vessel) than at the outer region of the disc. The high concentration of holes in the center of the piece and low on the outside creates the differential flow of gas, as shown in FIG. 3c.

In an exemplary embodiment, granules are placed into motion within the chamber from a heated carrier gas. Such a gas may be inert, such as nitrogen, or even a noble gas. The gas temperature is suitably in the range of from 80 deg. C. to about 120 deg. C., or even about 100 deg. C. A SiO$_2$ sol may be sprayed onto the granules from a nozzle or other outlet. The sol may be sprayed onto the granules for virtually any period of time; application periods of 1, 2, 5, 10, 20, or even 30 minutes are all suitable.

The sol flow rate may be in the range of from 0.5 mL/min, 1 mL/min, 2 mL/min, 5 mL/min, 10 mL/min, or even 20 mL/min. The sol then dries on the surface of the granules, giving rise to the desired coating. The curing may be performed at a temperature above ambient temperature, such as 75 deg. C., 80 deg. C., 100 deg. C., 120 deg. C., or 150 deg. C. The curing may be performed for 1-1000 minutes, with curing periods in the range of 0.5, 1, 2, 5, or 10 hours being particularly suitable.

For an exemplary process using 20 g of granules, the bottom of the set up may have a 5 cm diameter. If it is not possible to confine the high velocity zone in an inner tube, the circulation may be based on the design of the bottom piece of the vessel. For example, as shown in FIG. 3c, a higher concentration of holes is present in the center of the fritted disc than at the circumferential region of the disc. The high concentration of holes in the center of the piece and low on the outside creates the differential flow of gas, as shown in FIG. 3c.

Silica Coating

A silica coating may act to increase the granules' emissivity and to protect the metal against corrosion. The metallic layer alone reflects all the wavelengths above the plasma wavelength (~300 nm for silver, ~600 nm for copper) and thus prevents the FIR re-emission.

A sol-gel coating of TEOS is described here for illustrative purposes; sol-gel coatings allow working at lower temperature (e.g., around 100° C.), and a sol gel silica coating may be applied to granules for anti-algae application.

In this approach, the silica precursor TEOS (Tetra Ethyl Ortho-Silicate) is hydrolyzed by a low concentration solution of hydrochloric acid. The solution viscosity and coating thickness are controlled by adding an aqueous solution of PolyVinyl Alcohol (PVA).

The tested composition is less viscous (lower PVA concentration) but TEOS concentration is higher.

In this exemplary study, the following steps were performed:

20% PVA solution: 40 g of PVA are dissolved in 200 mL of hot deionized water (80° C.) for 1 h.

TEOS sol: 60 g of TEOS are added to 210 mL of hydrochloric acid solution (0.01M) at 60° C. for 1 h.

TEOS sol+PVA: 22 g of PVA solution are added to the TEOS sol.

The final silica content is 92 g/L and PVA concentration 16.7 g/L.

Coatings were made with a small fluidized bed. A temperature higher than 80° C. (176° F.) is necessary to evaporate the solvent (water), although water is not the only suitable solvent for this process. The fluidized bed parameters are presented in Table 1 below:

TABLE 1

Exemplary Fluidized bed parameters

| Vessel temperature (° C./° F.) | 80/176 |
|---|---|
| Admission gas flow (mL/min) | 1 |
| Coating time (min) | 10/20 |
| Liquid flow rate (mL/min) | 2 |

Figure 4:
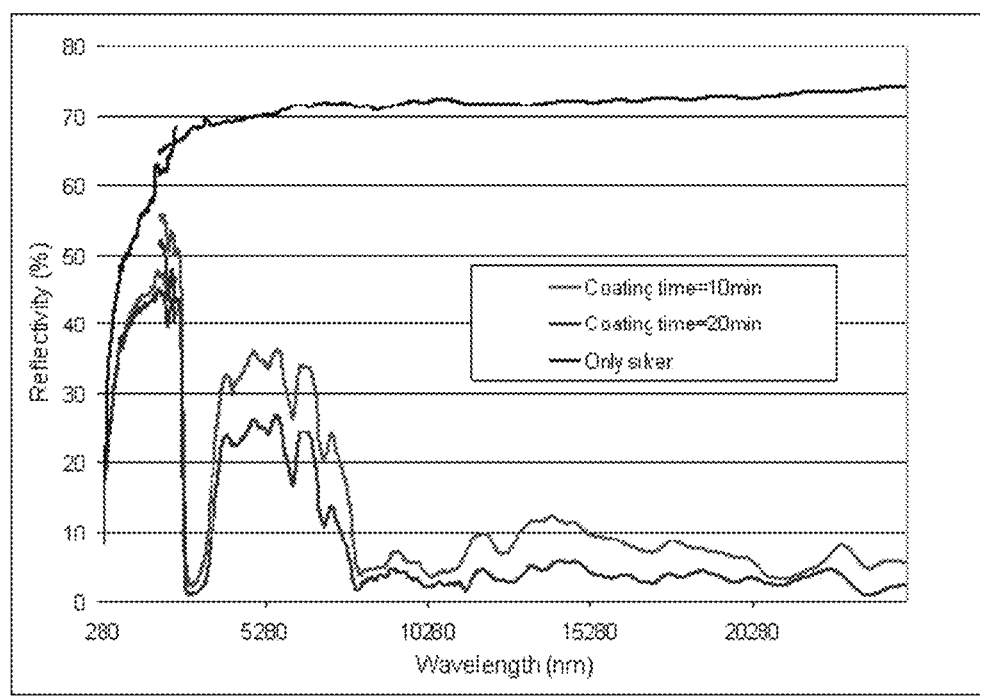
FIG. 4 illustrates a reflectivity spectrum of roofing granules that bear a silver layer and a silica layer.

Granules having a silver layer (along with a silica layer) were produced. The results of these tests are presented in FIG. 4, which figure illustrates the improvement in reflectivity realized by addition of a silica layer.

For a granule processed for 10 minutes, the reflectivity is low in FIR, especially above 10 μm coating thickness. For such samples, the calculated emissivity reaches 76%. This phenomenon persists when the coating time is longer; at 20 minutes of processing, the silica layer may be even thicker and absort even more FIR (emissivity 81%).

Figure 5:
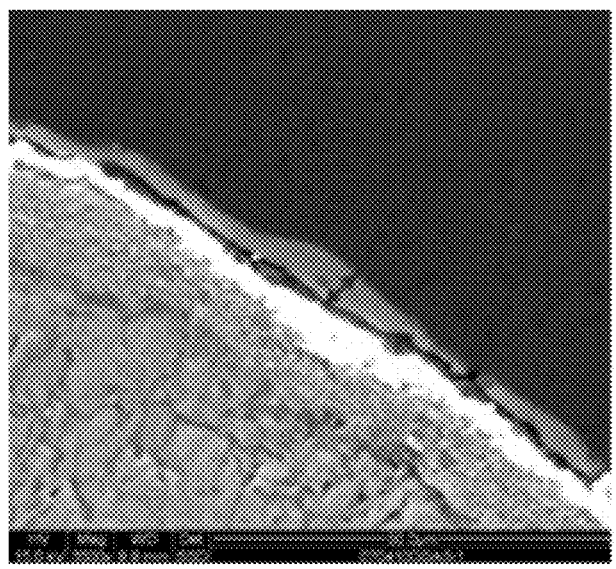
FIG. 5 illustrates a SEM cross-section of a granule coated with an exemplary coating composition according to the present disclosure for about 10 minutes.
Figure 6:
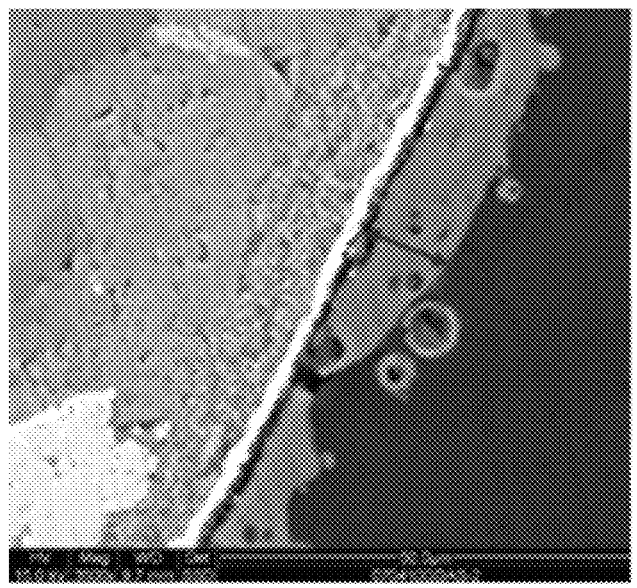
FIG. 6 illustrates a SEM cross-section of a granule coated with an exemplary coating composition according to the present disclosure for about 20 minutes.

Further characterization of these materials is made by SEM. SEM images are presented in FIG. 5 and FIG. 6. As shown in the figures, the coating thickness increases with increased processing time.

Various references (including patents, patent publications, and patent applications) are mentioned in this disclosure. Each of these references is incorporated herein in its entirety for any and all purposes.

What is claimed:

1. A coated construction granule, comprising:
   a core;
   a dielectric layer;
   a ceramic layer;
   a single layer disposed between the dielectric layer and the ceramic layer, the single layer being a conductive layer consisting essentially of a metal; and
   wherein the coated construction granule reflects greater than about 20% of incident solar radiation,
   wherein the coated construction granule has an emissivity of at least about 75%.

2. The coated construction granule of claim 1, wherein at least a portion of the dielectric layer contacts the core.

3. The coated construction granule of claim 1, wherein the metal includes an elemental metal or metal alloy comprising Ag, Cu, Au, Ni, Al, Ir, Pt, Rh, or Cr.

4. The coated construction granule of claim 1, further comprising a conductive oxide layer wherein the conductive oxide comprises indium-doped tin oxide, antimony-doped tin oxide, fluorine-doped tin oxide, niobium-doped titanium oxide, boron-doped zinc oxide, aluminum-doped zinc oxide, antimony-doped zinc oxide, gallium-doped zinc oxide, or any combination thereof.

5. The coated construction granule of claim 1, wherein the conductive metallic layer has a thickness in the range of from about 10 nm to about 2 μm.

6. The coated construction granule of claim 1, wherein the ceramic layer is farther from the core than the dielectric layer and the ceramic layer has a thickness of at least about 10 μm.

7. The coated construction granule of 12, wherein the ceramic layer comprises a silica.

8. The coated construction granule of claim 7, wherein the metal comprises a silver.

9. The coated construction granule of claim 1, wherein the dielectric comprises an oxide, nitride, oxinitride, carbide, oxicarbide or boride of one or more of the elements Hf, V, Nb, Cr, Mo, W, Mn, Fe, Zn, Sn, Ta, As, Sb, In, Si, Ti, Ze, Al, or any combination thereof.

10. The coated construction granule of claim 1, wherein the dielectric layer comprises a polymer.

11. The coated construction granule of claim 10, wherein the polymer is essentially transparent to electromagnetic radiation having a wavelength of from about 500 nm to about 2500 nm.

12. The coated construction granule of claim 1, wherein the dielectric layer and the ceramic layer comprise the same material.

13. The coated construction granule of claim 1, wherein the core comprises titanium dioxide, carbon, chromium iron oxide, chrome, chromium oxide, chrome titanate, iron oxide, iron, cobalt aluminate, cobalt chromite, cobalt titanate, cadmium, nickel titanate, strontium chromate, mica, or any combination thereof.

14. The coated construction granule of claim 1, wherein the core comprises a pigment.

15. The coated construction granule of claim 1, further comprising an outermost layer comprising silicone, a polymer, or any combination thereof.

16. The coated construction granule of claim 1, wherein the dielectric layer comprises a ceramic.

17. The coated construction granule of claim 1, wherein the conductive metallic layer consists essentially of a copper metal coating, a silver metal coating, or both.

18. The coated construction granule of claim 1, wherein any pigment or paint is included only in a material making up the core or on a surface of the core.

19. The coated construction granule of claim 1, wherein the conductive metallic layer is a single layer in direct contact with the dielectric layer and the ceramic layer, and the dielectric layer is in direct contact with the core or a pigment or paint on a surface of the core.

20. The coated construction granule of claim 1, wherein the coated construction granule has an emissivity of at least about 80%.

21. The coated construction granule of claim 1, wherein the coated construction granule consists of the core, an optional pigment layer overlying the core, the dielectric layer overlying the core or the pigment layer, the conductive layer overlying the dielectric layer, and the ceramic layer overlying the conductive layer.

22. A coated construction granule, comprising:
a core comprising an uncoated particulate material;
a conductive layer consisting essentially of a metal, the conductive layer directly contacting the core;
at least one dielectric layer overlying the conductive layer; and
a protective coating overlying the dielectric layer,
wherein at least one dielectric layer is in direct contact with the conductive layer, and
wherein the coated construction granule reflects greater than about 20% of incident solar radiation,
wherein the granule has an emissivity of at least about 75%.

23. The coated construction granule of claim 22, wherein the dielectric layer comprises a silica and has a thickness of at least 10 µm.

24. The coated construction granule of claim 23, wherein the conductive layer comprises a silver.

* * * * *